United States Patent Office
3,713,809
Patented Jan. 30, 1973

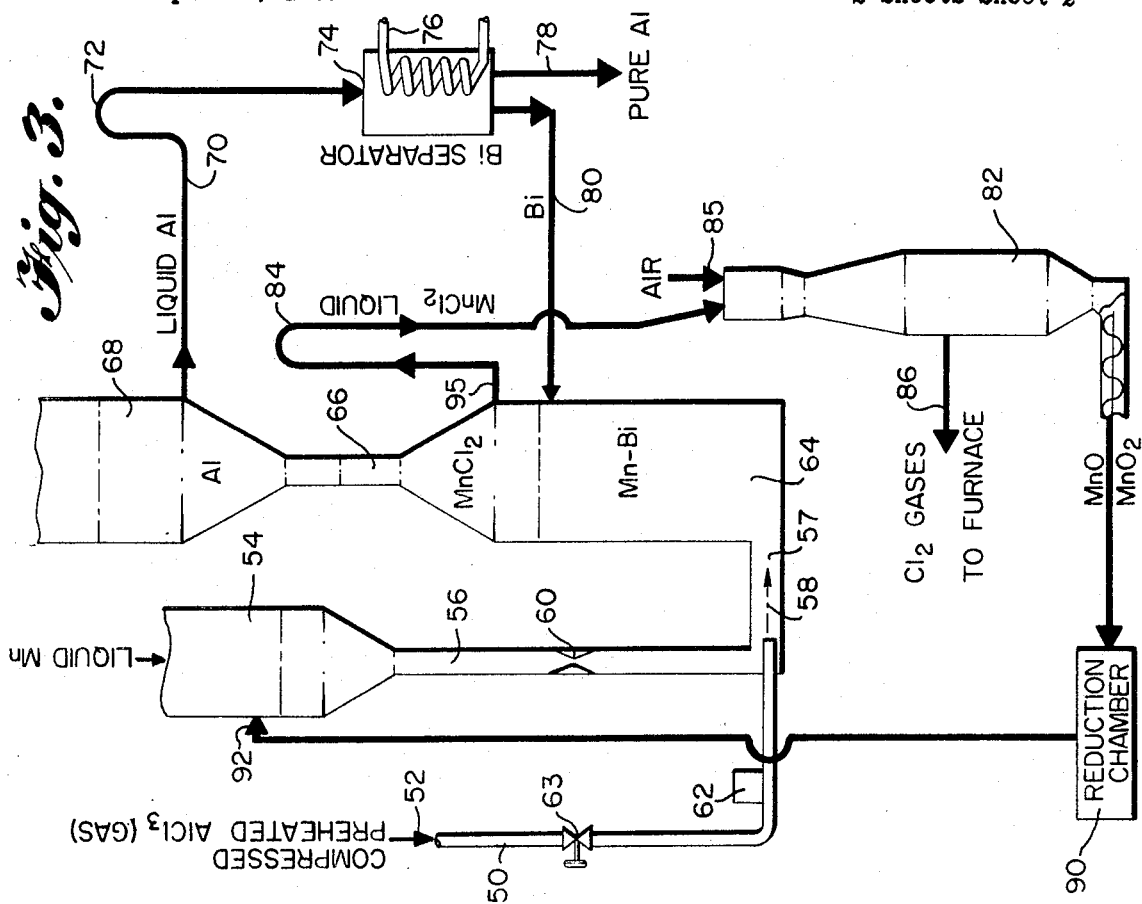
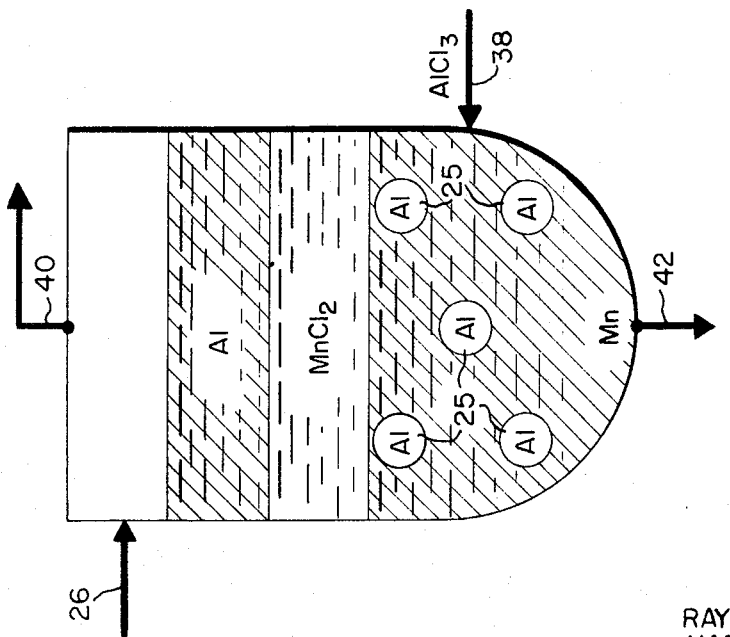

3,713,809
PROCESS FOR PRODUCING ALUMINUM
Charles Toth, Westwego, Raymond V. Bailey, Metairie, and Harry G. Harris, Jr., New Orleans, La., assignors to Applied Aluminum Research Corporation, Westwego, La.
Filed Sept. 15, 1969, Ser. No. 858,011
Int. Cl. C22b 21/02; C01g 45/06
U.S. Cl. 75—68 B     8 Claims

ABSTRACT OF THE DISCLOSURE

Process for the continuous production of aluminum from the reaction of aluminum trichloride and molten manganese including the step of alloying a solute flux in the molten manganese which prevents aluminum as it is formed in the process from alloying with manganese. The solute flux comprises a substance which is unreactive with the reaction mixture, highly miscible with manganese yet essentially immiscible with aluminum at the temperature of the reaction. Suitable solute fluxes include bismuth, lead, antimony, cadmium, tin, thallium, zirconium, vanadium, nickel, chromium, sulfur, silver, halogen, salts of the foregoing metals, alkali halides and alkaline earth halides.

BACKGROUND OF THE INVENTION

For a great many years, the universally employed process for manufacturing elemental aluminum has been the Bayer-Hall process. This process invloves the mixing of bauxite with concentrated sodium hydroxide and the cooking of the mixture at a high temperature and pressure for several hours. The aluminum content of the bauxite dissolves during the cooking to form a pregnant liquor and the pregnant liquor is decanted from the mud, filtered, cooled and diluted. After long (at least 48 hours), continuous agitation of the diluted solution, approximately 50% of the aluminum content of the solution precipitates out as aluminum hydroxide. This aluminum hydroxide is then calcined at approximately 1200° C. and electrically reduced with the help of carbon electrodes and molten cryolite.

This process has a number of significant disadvantages. In the first place, the bauxite employed must be extremely low in silica content (not greater than about 5% by weight), since the silica reacts with alumina and sodium hydroxide to form a sodium aluminosilicate in the form of a rock-like hard scale which tends to clog the equipment. Secondly, large alumina and sodium hydroxide losses result and a huge volume of liquid must be handled to produce a unit quantity of aluminum. Furthermore, the Bayer-Hall process has an extremely high energy requirement not only because the dilute solutions employed must be concentrated by evaporation, but because of the extremely high electrical energy requirement.

In patent application Ser. No. 692,036, filed Dec. 20, 1967 and entitled "Process for Producing Aluminum," now Pat. No. 3,615,359, a process is disclosed which involves the reaction of aluminum chloride with manganese to yield aluminum and manganese chloride. The invention disclosed in application Ser. No. 692,036 is one of the most significant advances in aluminum refining since the discovery of the Bayer-Hall process and provides for the first time in history of the aluminum industry a commercially practicable approach to the production of high quality aluminum by non-electrolytic means. More specifically, that invention broadly involves a cyclic process employing a two-step sequence, the first step involving the reaction of alumina under reducing conditions in the presence of carbon with manganese chloride to form aluminum trichloride and manganese and the second step involving the reaction of said aluminum trichloride and manganese at a temperature sufficient to reduce the aluminum trichloride to aluminum, following which the manganese chloride produced in the latter step is recycled to the first step.

However, when such two sequence process is performed, aluminum alloys with the molten manganese thus detracting from the highest possible yield of aluminum. In addition to such detraction from the total yield, the aluminum when alloyed with the manganese is in contact with the incoming aluminum trichloride creating an additional problem that aluminum trichloride and aluminum are known to react at high temperatures to form aluminum monochloride and any amount of aluminum monochloride produced detracts from the total net yield of pure aluminum. Additionally, such a process is not continuous, as would be desirable, but is operated in a batchwise manner.

The problems encountered in the foregoing process are significantly reduced in accordance with the present invention by alloying a solute flux with the molten manganese which prevents aluminum from dissolving in the manganese and enables a continuous operation.

SUMMARY OF THE INVENTION

A process is disclosed for the continuous production of aluminum from the reaction of aluminum trichloride and molten manganese. The improvement comprises the step of alloying a solute flux with the manganese in order to prevent the unreacted manganese from alloying with the aluminum reaction product. In a recycling operation the resulting manganese chloride reaction product is oxidized to yield manganese oxide and chlorine which are reacted further to yield manganese and aluminum trichloride.

It is accordingly a principal object of the present invention to provide a process for the continuous reduction of aluminum trichloride to produce pure metallic aluminum.

It is still another object of the present invention to provide a process for continuous reduction of aluminum trichloride to aluminum utilizing a manganese alloyable substance which significantly prevents the aluminum reaction product from alloying with the unreacted managanese.

Another object of the present invention is to provide a process for the oxidation of the $MnCl_2$ to $MnO$ and/or $MnO_2$.

BRIEF DESCRIPTION OF THE DRAWINGS

FIG. 2 is a diagrammatic illustration of an undesirable side reaction of the process illustrated in FIG. 1 yielding aluminum monochloride; and FIG. 3 is a schematic illustration of a process for producing aluminum from the reduction of aluminum trichloride utilizing a solute flux.

DESCRIPTION OF THE PREFERRED EMBODIMENTS

Figure 1:
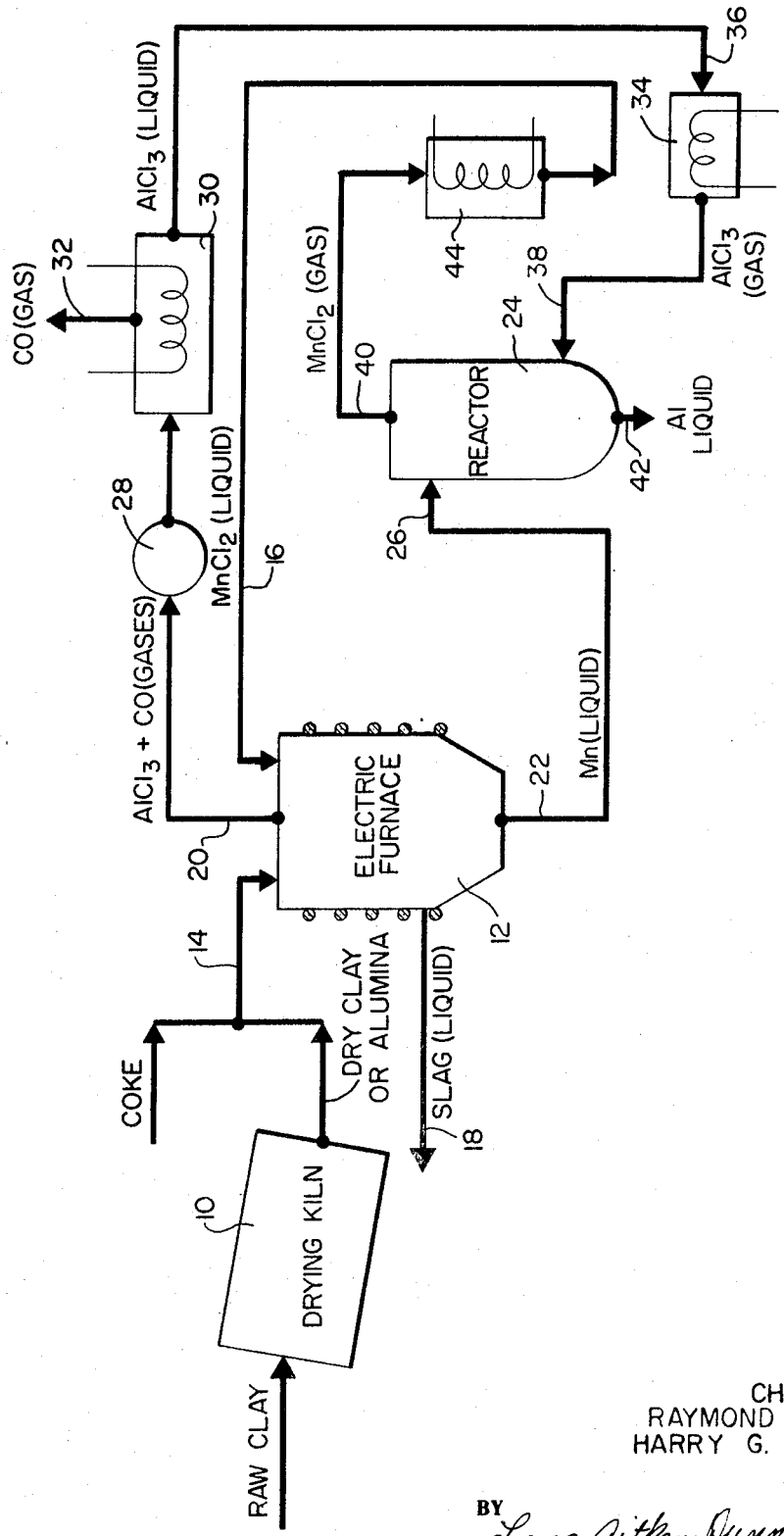
FIG. 1 is a schematic illustration of a process involving the production of aluminum from the reaction of aluminum trichloride and manganese.

FIG. 1 illustrates the process for the production of aluminum from the reaction of aluminum trichloride and manganese as is disclosed in U.S. patent application S.N. 692,036, filed Dec. 20, 1967 and entitled "Process for Producing Aluminum," the teachings of which are incorporated herein by reference.

Since the present invention is an improvement of the invention found in application S.N. 692,036, that process is described in its most general aspects with relation to FIGS. 1 and 2 and only in order to more easily understand the present invention.

An appropriate alumina-containing material (illustrated in the drawing as raw clay) is dried in kiln 10. The dried clay is mixed with coke and charged into electric furnace 12 at 14. Manganese chloride is passed into furnace 12 at 16. After the reaction in furnace 12 has been completed, aluminum trichloride and carbon monoxide are taken off as gases from furnace 12 at 20 while elemental manganese is removed as liquid at 22 and slag is drained from furnace 12 at 18.

The liquid manganese is charged into reactor 24 at 26. The aluminum trichloride and carbon monoxide gaseous mixture is compressed at 28 and the aluminum trichloride condensed as a liquid or solid in condenser 30 while the carbon monoxide is removed as a gas at 32. The aluminum trichloride liquid or solid passes into a heater 34 at 36 where it is converted to a gas which passes into reactor 24 at 38.

The aluminum trichloride gas is bubbled up through the liquid manganese in reactor 24 under appropriate reducing conditions to convert as much of the aluminum trichloride as possible to elemental aluminum. By carrying out the reduction reaction in reactor 24 at an appropriately high temperature, manganese chloride may be removed as a gas at 40 and aluminum along with unreacted manganese as a liquid at 42. The manganese chloride is then condensed in condenser 44 and recycled as a liquid feed at the desired temperature to furnace 12 at 16.

The gross reaction which takes place in furnace 12 is as follows:

(1) 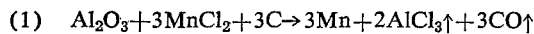 $Al_2O_3 + 3MnCl_2 + 3C \rightarrow 3Mn + 2AlCl_3\uparrow + 3CO\uparrow$ While the gross reaction which takes place may be thus illustrated, the reaction in fact involves a number of sub-reactions, some of them being listed as follows:

(2) 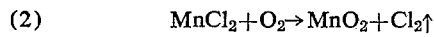 $MnCl_2 + O_2 \rightarrow MnO_2 + Cl_2\uparrow$ (3) 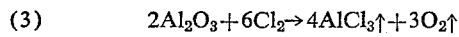 $2Al_2O_3 + 6Cl_2 \rightarrow 4AlCl_3\uparrow + 3O_2\uparrow$ (4) 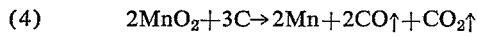 $2MnO_2 + 3C \rightarrow 2Mn + 2CO\uparrow + CO_2\uparrow$ (5)  $2C + O_2 \rightarrow 2CO\uparrow$ (6)  $CO + O \rightarrow CO_2\uparrow$ (7) 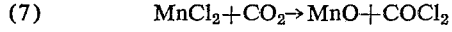 $MnCl_2 + CO_2 \rightarrow MnO + COCl_2$ (8) 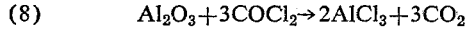 $Al_2O_3 + 3COCl_2 \rightarrow 2AlCl_3 + 3CO_2$ The gross reaction which takes place in reactor 24 may be generally illustrated as follows:

(9) 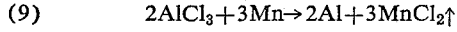 $2AlCl_3 + 3Mn \rightarrow 2Al + 3MnCl_2\uparrow$

As is shown in FIG. 1, the manganese chloride may be driven off as a gas with the elemental aluminum being drawn off as a liquid. Any unreacted manganese remaining in reactor 24 is also drawn off as a liquid along with the aluminum. In order to achieve this result, reactor 34 is operated at a temperature about about 1190° C. which is the approximate boiling point of manganese chloride. When this approach is used, it is preferable to condense the manganese chloride (as at 44) to a liquid and to recycle it to furnace 12.

Although reactor 24 can be operated at a temperature below about 1190° C. at a point at which manganese chloride will exit as a liquid, it is considered more desirable to operate reactor 24 at temperatures above about 1190° C. when utilizing the process disclosed in application S.N. 692,036.

Since reactor 24 is used under batch operation while furnace 12 is operated continuously, a number of reactors 24 should be employed for each furnace 12 depending upon the nature and size of the latter for optimum operation.

In the process shown in FIG. 1, the reaction in reactor 24 should be carried out until the reaction between the manganese and the aluminum chloride cease. This can be determined when the gaseous manganese chloride coming off from the top of the reactor 24 at 40 ceases to form a condensate and a heavy white dense cloud (which represents aluminum trichloride) appears in its place. The reaction is then stopped and the materials removed from reactor 24.

The mechanism by which the manganese serves to reduce the aluminum trichloride is believed to be as follows. At the temperatures employed in reactor 24, aluminum trichloride disassociates as follows:

(10)  $AlCl_3 \rightleftharpoons AlCl + 2Cl$

Since manganese forms a stable chlorine compound ($MnCl_2$) at the temperatures employed in the reactor, it reacts with the free chlorine formed from the foregoing disassociation to push the equilibrium in the direction of the formation of AlCl. The AlCl is unstable at such temperatures and reacts with the manganese as follows:

(11)  $2AlCl + Mn \rightarrow MnCl_2 + 2Al$

One disadvantage of the process disclosed in application S.N. 692,036 is that molten manganese dissolves aluminum metal as the aluminum metal is formed from the reaction of aluminum trichloride and manganese.

In most instances the presence of manganese in the final aluminum product is not undesirable. In fact it is common practice in the art to add manganese to manganese free aluminum in order to improve various properties of aluminum. However, the presence of aluminum within the manganese layer of reactor 24 makes certain undesirable side reactions possible. How the presence of aluminum in the manganese layer of reactor 24 contributes to such undesirable side reactions is explained below.

In addition to the side reaction problem, the process disclosed in application S.N. 692,036 cannot be operated continuously since it is necessary to stop the process periodically in order to remove the aluminum and remaining manganese from the reactor. Also, that process does not enable the production of manganese free aluminum.

The mechanism by which undesirable side reactions result is shown in FIG. 2 where three layers are shown. In order to have three layers, including a manganese chloride layer, the reaction is maintained at a temperature below 1190° C. In this embodiment a reduced pressure over the aluminum layer enables the removal of manganese chloride as a gas. At temperatures higher than 1190° C. there is no manganese chloride layer since the manganese chloride exits as a gas as formed. At the bottom of reactor 24 is the heaviest manganese layer upon which floats the manganese chloride layer. Aluminum having the lowest density of the three substances in reactor 24 floats at the surface of the manganese chloride layer. However, as was mentioned above, most of the aluminum is dissolved in the manganese layer as formed and this situation results in undesirable side reactions. This dissolved aluminum is represented diagrammatically in FIG. 2 a circle labeled Al and indicated by reference numeral 25. Thus, as is shown diagrammatically in FIG. 2, aluminum metal is available for contact with incoming aluminum trichloride which enters the reactor at 38.

When aluminum chloride contacts aluminum at the high temperatures present in the system, the following reaction occurs:

(12)  $AlCl_3 + 2\ Al \rightarrow 3\ AlCl$

The formation of such aluminum monochloride is undesirable since it tends to detract from what would otherwise be high yields of aluminum. In addition to detracting from high yields of aluminum, the presence of aluminum monochloride has a deleterious effect on the system as a whole, since aluminum monochloride can plug passageways in the system by combining with carbon and/or oxygen to form aluminum carbide and/or aluminum oxide.

Aluminum monochloride is known to be a very unstable compound. In fact, it is believed that aluminum monochloride can only exist in appreciable amounts at temperatures above 1100° C. Aluminum monochloride being unstable decomposes to yield aluminum and aluminum trichloride at lower temperatures. The aluminum further reacts with the manganese chloride to form volatile aluminum trichloride, manganese, and/or manganese monochloride. Thus side reactions create a situation where aluminum and aluminum trichloride are present in parts of the system where such presence is undesirable.

In accordance with the present invention the occurrence of such side reactions is significantly reduced by providing a manganese solute flux which is unreactive with the other constituents of the system and which, by its presence in a manganese solution, reduces the tendency of aluminum as it is being formed to dissolve in or alloy with said molten manganese. Such solutes include bismuth, lead, antimony, cadmium, tin, thallium, zirconium, vanadium, nickel, chromium, sulfur, silver halogen salts of above metals and alkali halides and alkaline earth halides.

In accordance with one embodiment of the present invention bismuth when present as a solute flux in a manganese solution has been found to significantly reduce the formation of aluminum monochloride by preventing aluminum from alloying with molten manganese. Bismuth has a useful property in that it is highly miscible with manganese yet only slightly miscible with aluminum at the temperature range of the reaction mixture.

It is to be understood that the use of bismuth as a solute is illustrative of the invention and is not intended to limit the scope and spirit of the invention in any way.

The controlling requirement for the selection of materials which can be utilized as a solute flux is that such materials at the reaction temperatures, be unreactive with the reaction mixture and that such materials be more soluble in manganese than aluminum. Any material which possesses these properties would produce operative results in accordance with the invention.

FIG. 3 illustrates schematically the process of the present invention. The apparatus shown schematically in FIG. 3 is designed to be usable with the apparatus shown in FIG. 1.

As is shown in FIG. 3, compressed and preheated aluminum trichloride is introduced into the contact zone via conduit 50 in the direction of arrow 52. Conduit 50 conducts aluminum trichloride from the furnace to reaction chamber 64 and corresponds to the piping arrangement shown at 38 in FIG. 1 for conducting aluminum trichloride into reactor 24.

Liquid manganese is contained by reservoir 54 and is fed continuously into the contact zone via conduit 56. As is explained below, a manganese chloride-manganese recycling system is possible by which a constant level of manganese in reservoir 54 can be maintained. Conduit 56 corresponds to the arrangement shown at 26 in FIG. 1 for introducing manganese into reactor 24. In FIG. 3 the manganese can be delivered from a furnace or a recycling system to be described.

In the present process, the temperature of the liquid manganese is maintained at about 1350° C. The aluminum chloride and manganese are introduced into a reaction zone 57 through manifold 58. The compressed and preheated aluminum chloride is injected into the liquid manganese stream in approximately stoichiometric quantities. Conduit 56 has an orifice 60 which provides a means for creating a constant flow rate of liquid manganese. A flow meter 62 is provided in conjunction with valve 63 to adjust the flow of aluminum chloride to provide the desired stoichiometric relationship.

At the moment of contact between aluminum trichloride and manganese a slight endothermic reaction occurs forming liquid aluminum and liquid manganese chloride. During this reaction the aluminum chloride gas bubbles collapse. The reduction of aluminum chloride starts in manifold 58 at zone 57 and is completed in reaction chamber 64. Reaction chamber 64 initially contains a manganese-bismuth alloy (solution). The amount of bismuth present in reaction chamber 64 can vary from percentages as low as 1% to amounts as high as 98%.

The amount of manganese present depends upon the contact time of the system. Thus with reaction chambers of heights of twenty feet only low percentages of manganese are required and accordingly high ranges of bismuth are used in such chambers. With smaller reaction chambers the percentage of manganese is increased while the percentage of bismuth is decreased by a proportionate amount.

As is shown in the drawing it is not necessary to introduce bismuth with the manganese as the manganese travels through conduit 56 into the reaction chamber. Since bismuth and the other disclosed solute fluxes are unreactive with the system, and only function to prevent aluminum metal from dissolving in the manganese, the amount of such fluxes present remains constant.

After reacting in chamber 64, liquid aluminum and liquid manganese chloride rise to the surface of the manganese-bismuth solution. Since the density of liquid aluminum is 2.7 and the density of liquid manganese chloride is about 3.0, the aluminum floats on the surface of the manganese chloride.

In order to minimize the solubility of the solute flux metal (in this case bismuth) in the aluminum, it is desirable to keep the temperatures at the zones of aluminum and manganese chloride at a low value (about 650° C.), since at temperatures over approximately 650° C. bismuth is slightly soluble in aluminum.

An important advantage of the use of a solute flux such as bismuth is that the temperatures required for aluminum production are significantly reduced. Without the use of such a solute flux, reaction chamber 64 would have to be kept at temperatures in excess of 1350° C. in order to ensure that the manganese would be present in a molten state. The inclusion of a solute flux such as bismuth, however, reduces the melting point of the resulting solution. Thus it is possible that the system can be successfully operated at temperatures considerably lower than 1300° C.

Perhaps the most significant advantage of including a solute metal is that it is possible to produce aluminum in a truly continuous manner. Since the manganese does not become contaminated with aluminum, the system itself need not be stopped in order to remove aluminum from the manganese. Since the system is capable of being operated continuously, it is economical to use smaller vessels than that which would normally be required for a batch operation.

It has also been discovered that at the interface boundary of the molten manganese chloride and molten aluminum, secondary reactions can take place. The reaction rates of such secondary reactions are very slow. Such reactions are the reverse reaction of reaction No. 9. To minimize such undesirable reverse reactions, reaction chamber 64 is tapered at the manganese chloride zone to form a narrow conduit 66, which joins aluminum reservoir 68. By providing such a structure above the reaction chamber the total surface area at the interface boundary between the molten manganese chloride and molten aluminum is reduced, thus significantly eliminating undesirable reverse reactions.

Reaction chamber 64 and aluminum reservoir 68 correspond to reactor 24 of FIG. 1.

In order to withdraw aluminum and recycle manganese chloride, chamber 64 and reservoir 68 have plumbing which is somewhat different than that shown for reactor 24 but which nevertheless accomplishes the same functions of removing aluminum and recycling manganese chloride.

Connected to aluminum reservoir 68 is gooseneck drain pipe 70. When the molten aluminum in reservoir 68 reaches the height of gooseneck 72, molten aluminum will flow from said reservoir into condenser 74. Condenser 74 is provided with cooling coils 76. Condenser 74 provides a means whereby molten aluminum can be separated from any small amount of bismuth which might be dissolved in the aluminum. Since the solubility of aluminum in bismuth is greatly controlled by temperature, the use of such a condenser provides a means for separating traces of bismuth from aluminum by cooling the product to cause a separation of said bismuth from aluminum. Aluminum is withdrawn from condenser 74 as is indicated by arrow 78. Arrow 78 corresponds to arrow 42 in FIG. 1. Any bismuth which might have been dissolved in the aluminum is recycled into reaction chamber 64 by suitable piping which is shown schematically in FIG. 3 by arrow 80.

In accordance with the invention the following example is provided which enables the continuous production of essentially manganese free aluminum.

Example

A Bessemer crucible or reactor is initially loaded with a mixture of 55% by weight of bismuth and 45% by weight of manganese. The crucible is loaded until approximately 9/10 of the volume of the lower half section is filled. The temperature of the section of the crucible containing the manganese-bismuth mixture is maintained at about 1150° C. The Bessemer crucible is similar to those commonly employed in the metallurgical arts with the exception that a narrow neck separates the crucible at the midsection thereof into upper and lower portions. The narrow neck reduces to a minimum the area where aluminum and manganese chloride contact. The total height of the chamber is approximately 20 feet with an inside diameter of 3 feet, the upper and lower portions of which taper symmetrically at 3 feet in each direction from the vertical midsection to provide an inside diameter of approximately 0.5 foot at the center of the reactor. Once the cruible is loaded with the manganese-bismuth mixture, aluminum trichloride and manganese are fed into the crucible at the bottom at the rate of 166 lbs. of aluminum trichloride gas per minute and 100 lbs. of manganese as a liquid per minute. The manganese before being mixed with the aluminum trichloride is maintained at a temperature of about 1450° C. The aluminum trichloride is compressed to 100 p.s.i.g. and heated to 1200° C., then injected into the flow of manganese. The aluminum and manganese chloride zones of the crucible are kept at a temperature of about 800° C. Manganese chloride is withdrawn from the reactor at a rate of approximately 3 tons per hour. The foregoing produces about 1 ton of aluminum per hour which is continuously drained off from the top of the crucible. The aluminum is then cooled to slightly above 650° C. by a condenser which also removes traces of bismuth.

In accordance with the present invention it is possible to recycle the manganese chloride by reacting said manganese chloride with air, oxygen or carbon dioxide to yield manganese oxide in accordance with one or a combination of the following equations:

(13)  $MnCl_2 + O_2 \rightarrow MnO_2 + Cl_2$

(14)  $MnCl_2 + CO_2 \rightarrow MnO + COCl_2$

(15)  $2MnCl_2 + O_2 \rightarrow 2MnO + Cl_2$

(16)  $2MnO + O_2 \rightarrow 2MNO_2$

To provide such recycling operation, the system is provided with a burner 82. A gooseneck manganese chloride drain 84 is connected to the manganese chloride zone of reaction chamber 64. As is shown in FIG. 3, the column of liquid formed by the liquid aluminum and molten manganese chloride will force manganese chloride up to the top of the gooseneck and down into burner 82. Burner 82 is provided with an inlet 85 for introducing air, pure oxygen, carbon dioxide or mixtures thereof.

Chlorous gases or chlorine containing vapors which are produced in burner 82 are drawn off as is indicated schematically by arrow 86. Such chlorine containing vapors are returned to the furnace to chlorinate clay or alumina in the presence of carbon in the conventional manner.

The manganese oxide and/or manganese dioxide produced within burner 82 precipitates as a solid, whereupon it is withdrawn and treated conventionally in a reduction chamber 90 to reduce the same to metallic manganese. The manganese is conducted into reservoir 54 at 92. This can be accomplished by melting the manganese and pumping the liquid to reservoir 54 by a pump (not shown).

It is also possible to withdraw manganese chloride by providing a vacuum over reservoir 68. Under reduced pressure (below atmospheric pressure to 0.001) manganese chloride vaporizes and passes through the aluminum level. This vapor can be collected and oxidized as described above.

The foregoing operation involving the recycling of manganese chloride by oxidizing the manganese chloride to ultimately yield manganese and chloride illustrates one method of recycling in accordance with the present invention. It should be understood that it is possible to recycle the manganese chloride by conducting manganese chloride from chamber 64 into the furnace in the same manner that is shown in FIG. 1 for recycling manganese chloride from reactor 24 into furnace 12. This system is not shown in FIG. 3 since the plumbing would be identical to that shown in FIG. 1, the only difference being that the manganese chloride would exit from chamber 64 as a liquid rather than as the gas shown in FIG. 1 and location 40 on FIG. 1 would appear at 95 on FIG. 3. When recycled directly to the furnace the grass reaction which takes place is reaction 1 described above.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

We claim:

1. A process for producing aluminum comprising: reacting gaseous aluminum trichloride with molten liquid manganese in a reaction zone at a temperature sufficient to reduce the aluminum chloride to produce liquid aluminum, said molten liquid manganese containing a solute flux dissolved therein which is unreactive with other constituents of the reaction mixture and is more soluble in liquid manganese than in liquid aluminum, said manganese being contained in a mass at least about 5% by weight of which is manganese at the time the aluminum trichloride first contacts said manganese at the beginning of said reaction, said reaction being carried out to provide a net increase in the quantity of said liquid aluminum alloy produced from said reaction zone, and one of the reaction products being manganese chloride; separating the resulting manganese chloride and aluminum from said molten manganese to provide an aluminum layer and a manganese chloride layer; extracting aluminum from said aluminum layer; extracting manganese chloride from the manganese chloride layer; reacting said manganese chloride to yield manganese oxide and chlorine; reducing said manganese oxide to manganese; and recycling said manganese back into the reaction mixture.

2. The process as set forth in claim 1 wherein the step of reacting the manganese chloride comprises oxidizing said manganese chloride with an oxidizing agent selected from the group consisting of air, oxygen, carbon dioxide and mixtures thereof.

3. The process as set forth in claim 1 wherein said recycling operation comprises evacuating said manganese chloride under reduced pressure as a vapor from said manganese chloride layer.

4. The process as set forth in claim 1 wherein the cross-sectional area at the interface of the manganese chloride and aluminum layers is smaller than the cross-sectional area of other parts of said layers not at the interface.

5. A process for producing aluminum, comprising the steps of: (a) reacting aluminum trichloride and manganese; (b) controlling the temperature of the reaction to result in a manganese chloride layer and an aluminum layer as reaction products; and (c) providing a cross-sectional area at the interface of the manganese chloride and aluminum layers that is smaller than the average cross-sectional area of other parts of said layers not at the interface.

6. A process for producing aluminum comprising: reacting gaseous aluminum trichloride with molten liquid manganese in a reaction zone at a temperature sufficient to reduce the aluminum chloride to produce liquid aluminum, said molten liquid manganese containing bismuth as a solute flux dissolved therein, said manganese being contained in a mass at least about 5% by weight of which is manganese at the time the aluminium trichloride first contacts said manganese at the beginning of said reaction, said reaction being carried out to provide a net increase in the quantity of said liquid aluminum alloy produced from said reaction zone.

7. The process as set forth in claim 6 wherein the temperature of the system is maintained so that bismuth is only very slightly soluble in aluminum.

8. The process as set forth in claim 7 wherein the temperature of the system is within the range of approximately 700° C. to 1250° C.

References Cited

UNITED STATES PATENTS

| | | | |
|---|---|---|---|
| 3,615,359 | 10/1971 | Toth | 75—68 R |
| 2,382,723 | 8/1945 | Kirsebom | 75—63 X |
| 2,452,665 | 11/1948 | Kroll et al. | 75—63 |
| 3,078,159 | 2/1963 | Hollingshead et al. | 75—68 BX |
| 3,290,141 | 12/1966 | Johnson | 75—68 R |

HENRY W. TARRING II, Primary Examiner

U.S. Cl. X.R.

75—63, 68 R; 23—87 R